(12) United States Patent
Park

(10) Patent No.: US 11,442,177 B2
(45) Date of Patent: Sep. 13, 2022

(54) SYSTEM AND METHOD TO TRANSPORT GPS SIGNALS AND RADIO FREQUENCY SIGNALS OVER A FIBER OPTIC CHANNEL WITH POWER SUPPLIED OVER THE FIBER OPTIC CHANNEL

(71) Applicant: Intelibs, Inc., Stony Brook, NY (US)

(72) Inventor: Seyong Park, Setauket, NY (US)

(73) Assignee: Intelibs, Inc., Stony Brook, NY (US)

( * ) Notice: Subject to any disclaimer, the term of this patent is extended or adjusted under 35 U.S.C. 154(b) by 249 days.

(21) Appl. No.: 16/908,323

(22) Filed: Jun. 22, 2020

(65) Prior Publication Data
US 2020/0400839 A1     Dec. 24, 2020

Related U.S. Application Data

(60) Provisional application No. 62/864,013, filed on Jun. 20, 2019.

(51) Int. Cl.
*H04B 10/00* (2013.01)
*G01S 19/34* (2010.01)
(Continued)

(52) U.S. Cl.
CPC ............. *G01S 19/34* (2013.01); *H01Q 1/242* (2013.01); *H04B 1/1607* (2013.01); *H04B 10/503* (2013.01); *H04B 10/564* (2013.01)

(58) Field of Classification Search
CPC ...... G01S 19/34; H01Q 1/242; H04B 1/1607; H04B 10/503; H04B 10/564; H04B 1/52;
(Continued)

(56) References Cited

U.S. PATENT DOCUMENTS 5,608,565 A    3/1997   Suzuki et al.
6,016,120 A    1/2000   McNabb et al.
(Continued)

OTHER PUBLICATIONS

Direct GPS-over-Fiber. Datasheet [online]. HUBER+SUHNER, Inc. 2020 [retrieved on Jul. 19, 2019]. Retrieved from the Internet: <URL: www.hubersuhner.com/en/products/radio-frequency/rf-over-fiber-series/direct-gps-over-fiber>.

*Primary Examiner* — Hibret A Woldekidan
(74) *Attorney, Agent, or Firm* — John L. Deangelis; Wolter, Van Dyke, Davis, PLLC

(57) ABSTRACT

A GPS system within a structure. The system comprises a front-end unit (FEU) and a back-end unit (BEU); FEU receives a GPS signal, amplifying it if required and forwarding the signal to the BEU for further processing (and amplification if required) for determining the location. The BEU and FEU cooperate to optimize the received GPS signal before processing, exchanging control and operating parameters information related to receiving and processing the GPS signal. The BEU also supplies power to the FEU. Advantageously, exchange of signals and power between the BEU and FEU occurs over one or more fiber optic channels or conductors. Certain embodiments employ multiplexing and demultiplexing schemes to reduce the number of discrete signal paths between the FEU and BEU. Additionally, the system embodies a control algorithm to ensure adequate GPS signal strength for processing and also shuts the system down upon signal loss or degradation.

14 Claims, 7 Drawing Sheets

(51) Int. Cl.
*H01Q 1/24* (2006.01)
*H04B 1/16* (2006.01)
*H04B 10/564* (2013.01)
*H04B 10/50* (2013.01)

(58) Field of Classification Search
CPC ........ H04B 10/43; H04B 10/40; H04B 10/07; H04B 10/0775; H04B 10/0777; H04B 10/0773; H04B 10/07955; H04B 10/07953; H04B 10/1123
USPC .................. 398/115–117, 135, 137
See application file for complete search history.

(56) References Cited

U.S. PATENT DOCUMENTS

| | | | |
|---|---|---|---|
| 6,157,621 A * | 12/2000 | Brown ................ | H01Q 15/02 370/310 |
| 6,337,754 B1 | 1/2002 | Imajo | |
| 6,690,917 B2 | 2/2004 | Soliman et al. | |
| 7,286,762 B2 | 10/2007 | Elahmadi et al. | |
| 7,302,192 B2 | 11/2007 | Elahmadi et al. | |
| 7,501,993 B2 | 3/2009 | Boucher | |
| 7,672,591 B2 | 3/2010 | Soto et al. | |
| 7,715,731 B2 | 5/2010 | Elahmadi et al. | |
| 7,809,286 B2 | 10/2010 | Ide et al. | |
| 7,877,023 B2 | 1/2011 | Uto | |
| 8,022,885 B2 | 9/2011 | Smoyer et al. | |
| 8,164,520 B2 | 4/2012 | Raeder et al. | |
| 8,193,983 B1 | 6/2012 | Farmer | |
| 8,284,112 B2 | 10/2012 | Otto et al. | |
| 8,326,145 B2 | 12/2012 | Takahara | |
| 8,374,513 B2 | 2/2013 | Koiwai | |
| 8,471,780 B2 | 6/2013 | Dalmazzo | |
| 9,042,732 B2 | 5/2015 | Cune et al. | |
| 9,119,083 B2 | 8/2015 | Zimmerman | |
| 9,143,233 B2 | 9/2015 | Hurwitz et al. | |
| 9,270,374 B2 | 2/2016 | Cune et al. | |
| 9,419,728 B2 | 8/2016 | Sheu | |
| 9,503,922 B1 | 11/2016 | Ford et al. | |
| 9,859,986 B2 | 1/2018 | Tanaka et al. | |
| 9,917,638 B1 * | 3/2018 | Bartur .............. | H04B 10/25752 |
| 10,050,707 B2 | 8/2018 | Hurwitz et al. | |
| 10,178,566 B2 | 1/2019 | Guttenfelder et al. | |
| 10,211,971 B2 | 2/2019 | Miao et al. | |
| 10,541,462 B2 | 1/2020 | Trushanin et al. | |
| 10,734,700 B2 | 8/2020 | Tiwari et al. | |
| 2010/0321647 A1 * | 12/2010 | Schuler ................ | G06F 1/3265 715/764 |
| 2013/0188959 A1 * | 7/2013 | Cune ................ | H04B 10/25753 398/115 |
| 2014/0320340 A1 * | 10/2014 | Stapleton ................. | G01S 5/14 342/464 |
| 2015/0147066 A1 * | 5/2015 | Benjamin ........ | H04B 10/25759 398/116 |
| 2016/0173201 A1 | 6/2016 | Cune et al. | |
| 2018/0062825 A1 * | 3/2018 | Miao ................ | H04B 10/25753 |
| 2018/0372883 A1 * | 12/2018 | Long ..................... | G01S 19/13 |
| 2019/0028180 A1 | 1/2019 | Schmid et al. | |
| 2019/0081771 A1 | 3/2019 | Miao et al. | |
| 2020/0052875 A1 * | 2/2020 | Scarpa ..................... | G01S 19/29 |

* cited by examiner

SYSTEM AND METHOD TO TRANSPORT GPS SIGNALS AND RADIO FREQUENCY SIGNALS OVER A FIBER OPTIC CHANNEL WITH POWER SUPPLIED OVER THE FIBER OPTIC CHANNEL

CROSS REFERENCE TO RELATED APPLICATION

The present application claims priority to the provisional patent application assigned No. 62/864,013 filed on Jun. 20, 2019, which is incorporated herein in its entirety.

FIELD OF THE INVENTION

The invention relates to a global positioning system (GPS) radio frequency (RF) system that uses a fiber optic channel between the GPS antenna and the GPS receiver. The system is operated by electric power that is also fed over the fiber optic cable.

BACKGROUND OF THE INVENTION

GPS systems for determining a location are known. But in certain environments, the GPS signal may not be received at sufficient power levels to accurately determine the location. The present invention presents a technique for overcoming this disadvantage.

BRIEF DESCRIPTION OF THE FIGURES

The following sections will be better understood when read in conjunction with the appended drawings. For the purpose of illustrating the invention, there are shown in the drawings exemplary embodiments of the invention; however, the invention is not limited to the specific methods, compositions, and devices disclosed. In the drawings.

DETAILED DESCRIPTION OF THE INVENTION

Figure 1:
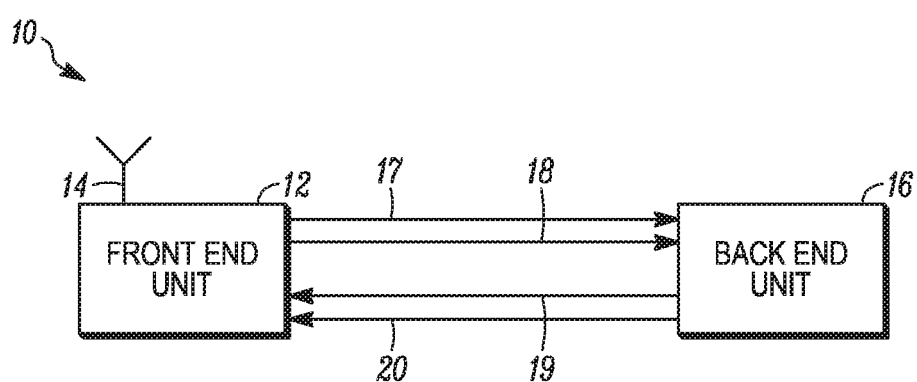
FIG. 1 is an overview block diagram of a system constructed according to the teachings of the present invention.

The present invention may be understood more readily by reference to the following detailed description taken in connection with the accompanying figures and examples, which form a part of this disclosure. It is to be understood that this invention is not limited to the specific devices, methods, applications, conditions or parameters described and/or shown herein, and that the terminology used herein is for the purpose of describing particular embodiments by way of example only and is not intended to be limiting of the claimed invention.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

It is to be appreciated that certain features of the invention which are, for clarity, described herein in the context of separate embodiments, may also be provided in combination in a single embodiment. Conversely, various features of the invention that are, for brevity, described in the context of a single embodiment, may also be provided separately or in any sub-combination. Further, references to values within a stated range include each and every value within that range. Additionally, the disclosures of each patent, patent application, and publication cited or described in this document is incorporated herein by reference in its entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the spirit and scope of the invention.

For the benefit of clarity, this detailed description presents examples of how the invention could be implemented and is not to be taken or considered in a limiting sense. The appended claims, as well as the full range of equivalent embodiments to which such claims are entitled, define the scope of various embodiments of the subject invention for different types of businesses. This disclosure is intended to cover any and all adaptations, variations, or various embodiments.

Combinations of presented embodiments, and other embodiments not specifically described herein by the descriptions, examples, or appended claims, may be apparent to those of skill in the art upon reviewing the above description and are considered part of the current invention.

The present invention relates to a GPS system providing power over an optical fiber cable. The power is supplied at a laser wavelength to operate the GPS antenna and RF receiver in a front-end unit. Since the received GPS signal level may be very low or unstable, possibly caused by the location of the GPS antenna (e.g. blocked by surrounding buildings), the system constantly monitors the GPS signal level, quality, and system gain budget, which are the key performance parameters. The invention defines an operating algorithm to ensure GPS reception by automatic adjustment of system gain and safe operation, preventing hazardous operation caused by leaking laser energy due to a failed fiber optical cable.

As illustrated in FIG. 1, a GPS system 10 comprises a GPS front end unit (FEU) 12, typically located on a rooftop of a building. The front-end unit 12 receives a GPS RF signal from an orbiting satellite at an antenna 14, converts the RF signal to a GPS optical signal 17 and transmits the optical signal over a fiber optic cable to a back-end unit (BEU) 16. At the back-end unit 16 the GPS optical signal is reconverted to an RF signal and input to a GPS receiver. Modules of the front-end and back-end units are described below in conjunction with the several figures.

A parameter signal 18 is also sent to the BEU 16 over a fiber optic cable for use in developing control signals 19 that are sent from the BEU 16 to modules of the FEU 12, as further described below. For example, the signal 18 may comprise a gain control reference signal, a heartbeat message that indicates connectivity between the FEU and the BEU, and alarms and status reporting messages for processing by the BEU.

A power signal 20 is also supplied to the modules of the FEU 12 from the BEU, again preferably over an optical cable path.

The GPS optical signal, the parameter optical signal, the control optical signal, and the power optical signal can be carried between the FEU and the BEU over one or more independent optical fiber links. Alternatively, various combinations of these signals can be multiplexed and demultiplexed, as further described below, to be carried over a fewer number of optical fibers.

Generally, the system 10 measures the signal quality (e.g. C/No, carrier-to-noise density) and signal strength (e.g. dBm). If the signal quality falls below a predefined threshold, a controller in the front-end unit sends a command to increase the signal gain in an RF gain stage in the FEU or the BEU. Preferably, both the FEU and the BEU measure the signal quality. By default, the BEU provides primary control unit to determine the system gain, based on the measured data, while the FEU can also provide the same functionality.

If the GPS signal quality is good, no additional gain increases are executed. If the signal quality is good but the signal strength is too high, the controller sends a command to lower the signal gain at the RF gain stage in the FEU. If the signal quality does not improve, even at maximum gain, the system generates an alarm, as further described below.

In lieu of using C/No, the conventional signal-to-noise ration SNR can also be used to determine whether gain adjustments are warranted.

As referred to above, the back-end unit 16 supplies power to the front-end unit 12. If the GPS signal is lost, the system terminates the supply of power to the front-end unit, powers-up the system for one second, and then turns off the power if no signal was detected during the power-up phase. This process is repeated ten times or over a predetermined time interval (according to various embodiments). If no signal was detected during the ten attempts, a reporting email is issued to responsible personnel.

FIG. 1 depicts one embodiment wherein four fiber optic cables connect the FEU 12 and the BEU 16. Typically, the GPS signal is carried over the optical fiber 17, and power over the optical fiber 20. Control and information (operational parameters) signals are carried over the optical fibers 18 (from the FEU to the BEU) and 19 (from the BEU to the FEU).

The acronym LD as used in the various figures identifies a laser diode for converting an electrical signal to an optical signal and the acronym PD identifies a photo diode for converting an optical signal to an electrical signal.

Figure 2:
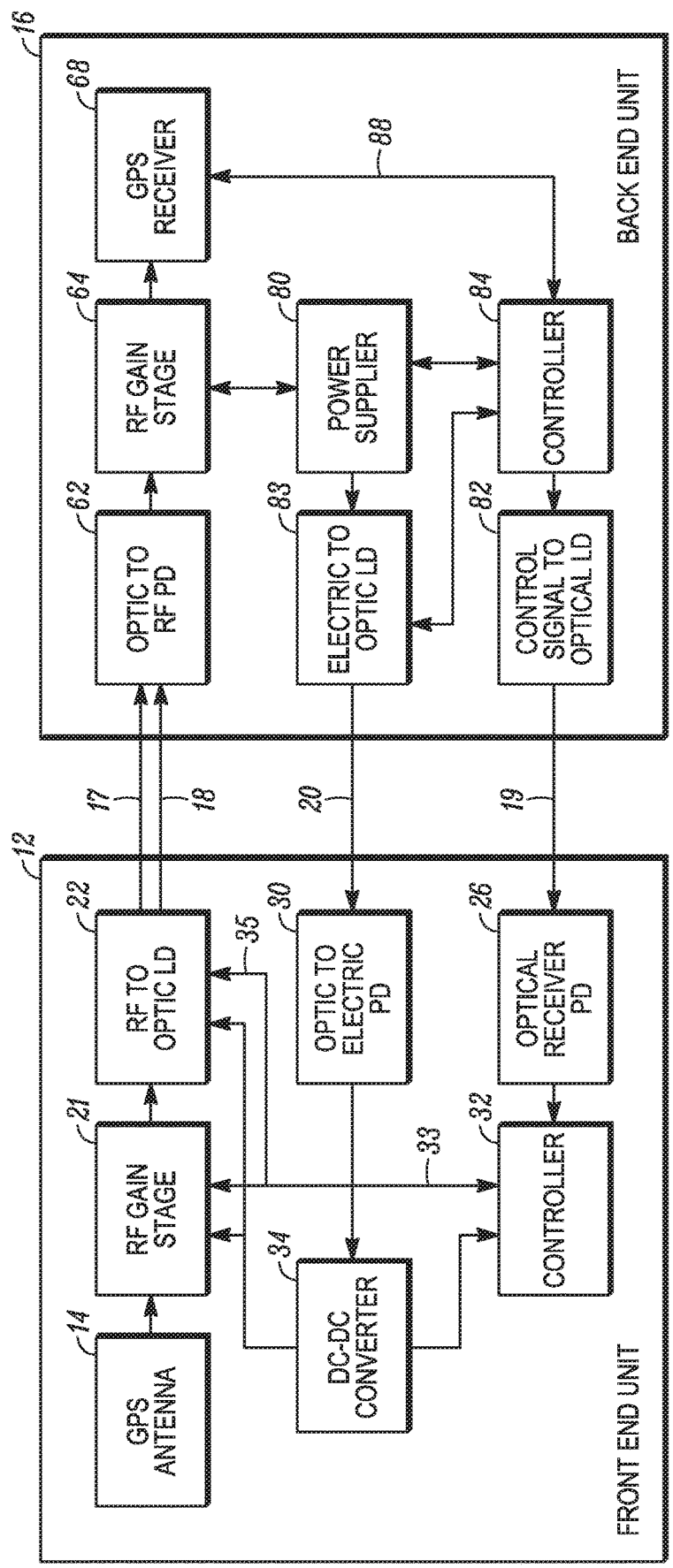
FIGS. 2-6 are block diagrams of different embodiments of the system of FIG. 1.

In FIG. 2, the front-end unit 12 comprises the GPS antenna 14 for receiving a GPS satellite signal. The antenna inputs the received signal to an RF gain stage 21 for amplifying the GPS RF signal level, if required, to compensate any signal losses in the signal path.

Due to the low signal level of the received RF GPS signal, the RF gain stage 21 typically comprises LNAs (low noise amplifiers) to increase the amplitude of the received GPS signal. The gain also compensates for any signal quality degradation that may occur later during RF-to-optical conversion, degradation along the RF signal path, and degradation along the optical signal path.

A laser diode 22 converts the RF GPS signal to a GPS optical signal for transmitting over the fiber optic cable 17 to the back-end unit 16.

A control signal 19 from the BEU 16 is input to a photodiode 26 in the FEU 12 for conversion to an electrical signal. The electrical signal is input to a controller 32. Responsive to the received control signal, control signals issued by the controller 32 are input to the RF gain stage 21 for controlling the gain thereof via a bidirectional link 33.

In the reverse direction, parameter values and other information is input from the RF gain stage 21 to the controller 32 via the bidirectional link 33, for use by the controller 32 in controlling the RF gain stage. These parameter values are also supplied to the BEU 16 as further described below. Typically, these parameters represent status information for the various components of the FEU 12, temperature, signal level, pilot signal for gain adjustment, and an alarm message, which is further described below.

Signals from the controller 32, representing these parameter values and other information, are input to the laser diode 22, via a link 35, for transmitting to the back-end unit 16 over the optical fiber 18. These signals are sent to the back-end unit for use in developing control signals and control strategies for execution by the controller 32 (in the FEU) and the controller 84 (in the BEU).

A photodiode 30 receives a power optical signal from the BEU 16 over the fiber optic cable 20 and converts the power optical signal (as initially supplied from a power supply within the back-end unit 16) to an electric power signal. A DC to DC converter 34 receives the electrical power signal and modifies the DC voltage as required by the various modules of the FEU 12. The power output from the DC to DC converter 34 supplies power to various modules of the front-end unit, such as the RF gain stage 21, the laser diodes 22, and the controller 39. The various power connections are shown in FIG. 2.

It is recognized, however, that the amount of power supplied over the fiber optical cable from the BEU 16 via the power optical signal may not be substantial and thus it is desired that the system receives a strong RF GPS signal to reduce power requirements of the modules of the FEU 12, especially the RF gain stage 21. Also, if the power supplied from the BEU to the FEU is not sufficient to provide enough signal amplification in the FEU, additional amplification is provided in the BEU, as described below.

Turning now to the back-end unit 16, the GPS optical signal is received over the cable 20 and converted from the optical domain to the electrical domain in a photodiode 62.

An RF gain stage 66 amplifies the GPS electrical signal as required and supplies the electrical signal to a GPS receiver 68. The receiver processes the input signal to derive GPS location information and a timing source in the standard format, such as SyncE or a baseband radio signal. In one embodiment, it is important to provide location information so that location-based services or E911 services can be supplied with the location information.

Control parameters 18 are input to the BEU 16, specifically the photodetector 62 and from there to a controller 84 in the BEU. These control parameters are used to: (1) adjust the system gain parameter by measuring the signal level, if the signal level is too low, then the controller 84 increase the gain of the RF gain stage 66, (2) BEU controller 84 also uses the control parameters from the FEU to determine system operation, such as a shutting down power transmission to the FEU 12 when the signal is lost or if an alarm message is present in the control parameters received from the FEU 12.

A power supply 80 supplies power to the back-end unit modules (e.g. the RF gain stage 66, the controller 84, the laser diode 82, and the GPS receiver 68). The power supply 80 also supplies power to a laser diode 83 that converts the electric power signal to an optical signal/wavelength to provide power to the modules of the front-end unit 12 over the fiber optic cable 20.

The controller 84 monitors the GPS RF signal level at the GPS receiver 68, via a bidirectional link 88 and maintains the GPS receiver in a locked status. The controller 84 also issues control signals to the front-end unit 12 through the laser diode 82 (which converts the electrical signals to optical control signals) and then over an optical path 19 to the FEU 12. The control signals are received at the FEU by the controller 32, for issuing control signals to the various modules of the FEU.

Figure 3:
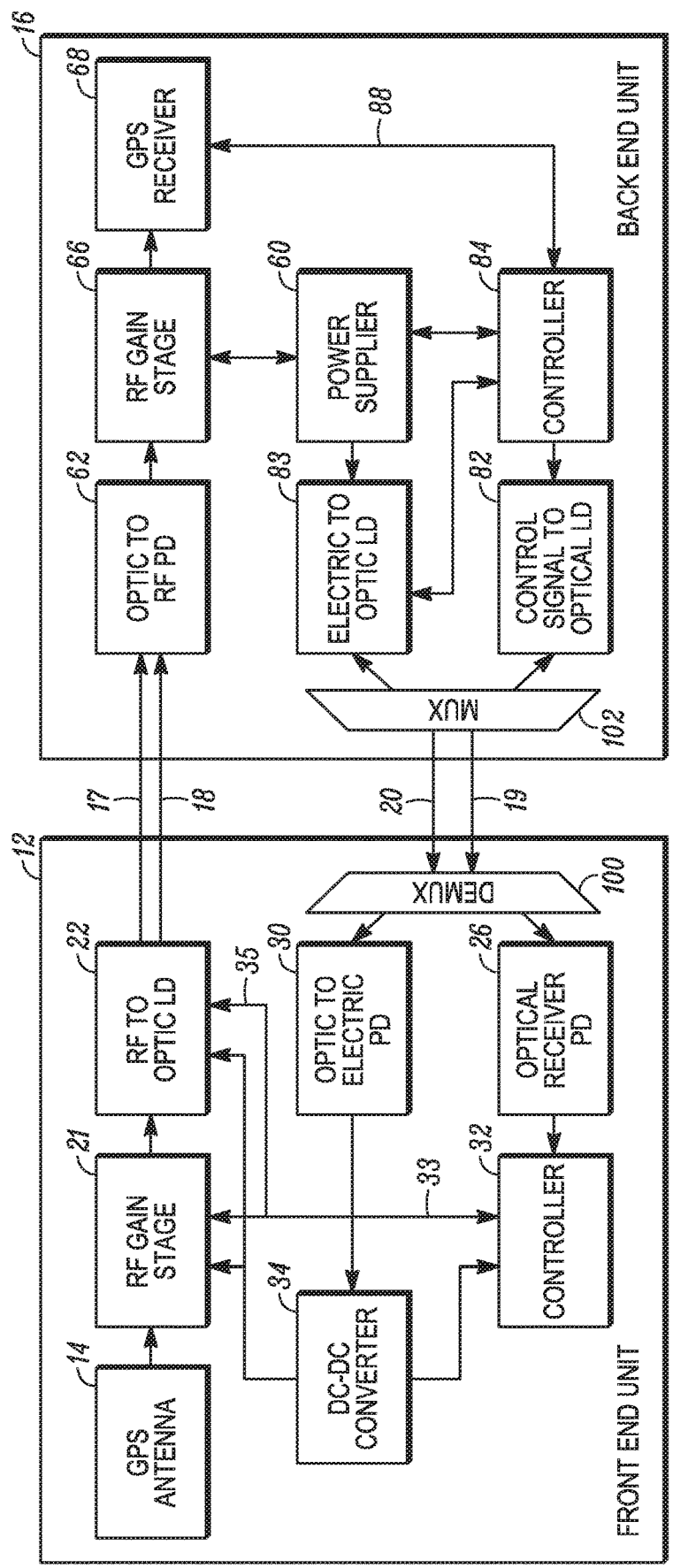

FIG. 3 depicts a different embodiment comprising the same modules as in FIG. 2, but with the addition of a demultiplexer 100 in the FEU 12 and a multiplexer 102 in the BEU 16. Thus, the control optical signal and the power optical signal are carried over the same fiber optic cable, using multiplexing principles known to those skilled in the art. For example, the two signals can be wavelength-division multiplexed for carrying over the same fiber cable.

Figure 4:
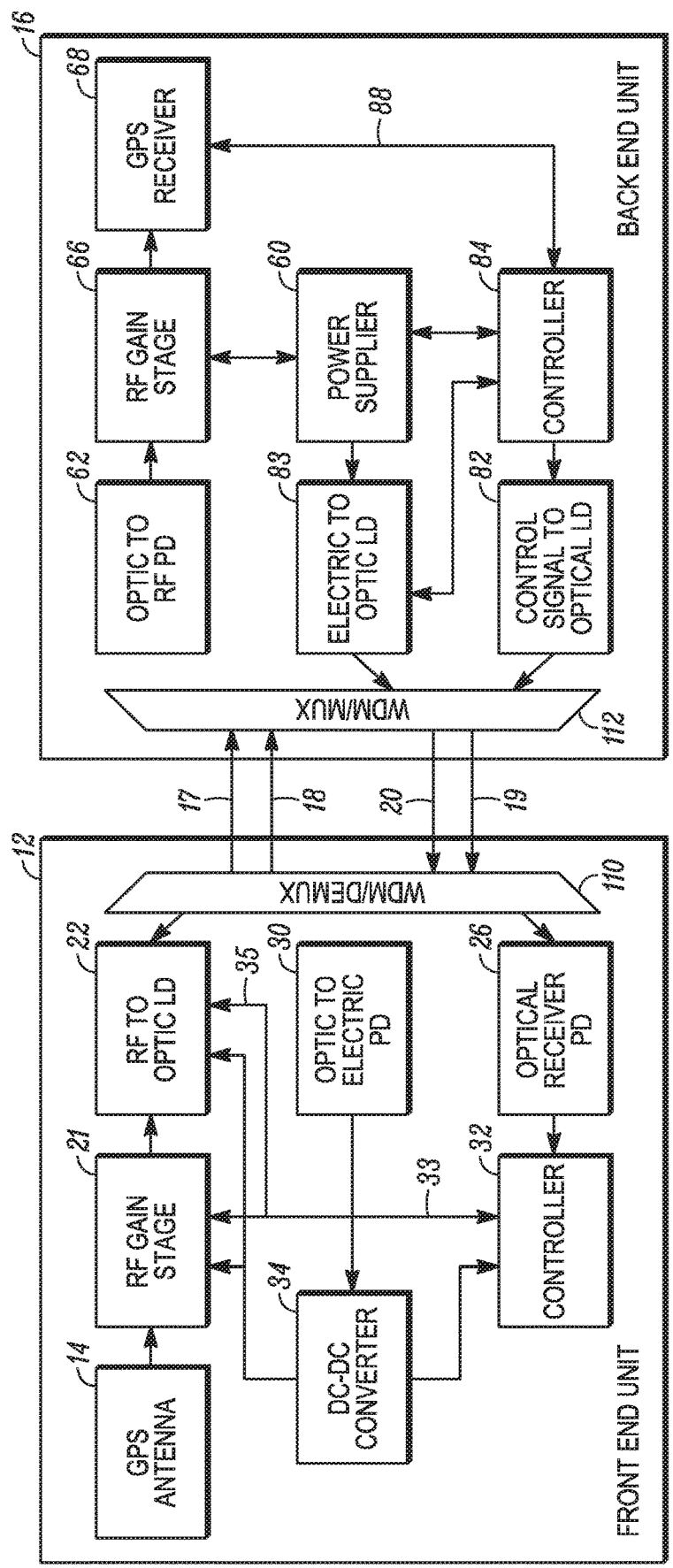

FIG. 4 presents an embodiment with multiplexer/demultiplexer 110 in the FEU 12 and a multiplier/demultiplexer 112 in the BEU 16. According to this embodiment, the GPS optical signal, the parameter optical signal, the control optical signal, and the power optical signal can be carried over the same fiber optic cable, again employing multiplexing and demultiplexing techniques known in the art.

Figure 5:
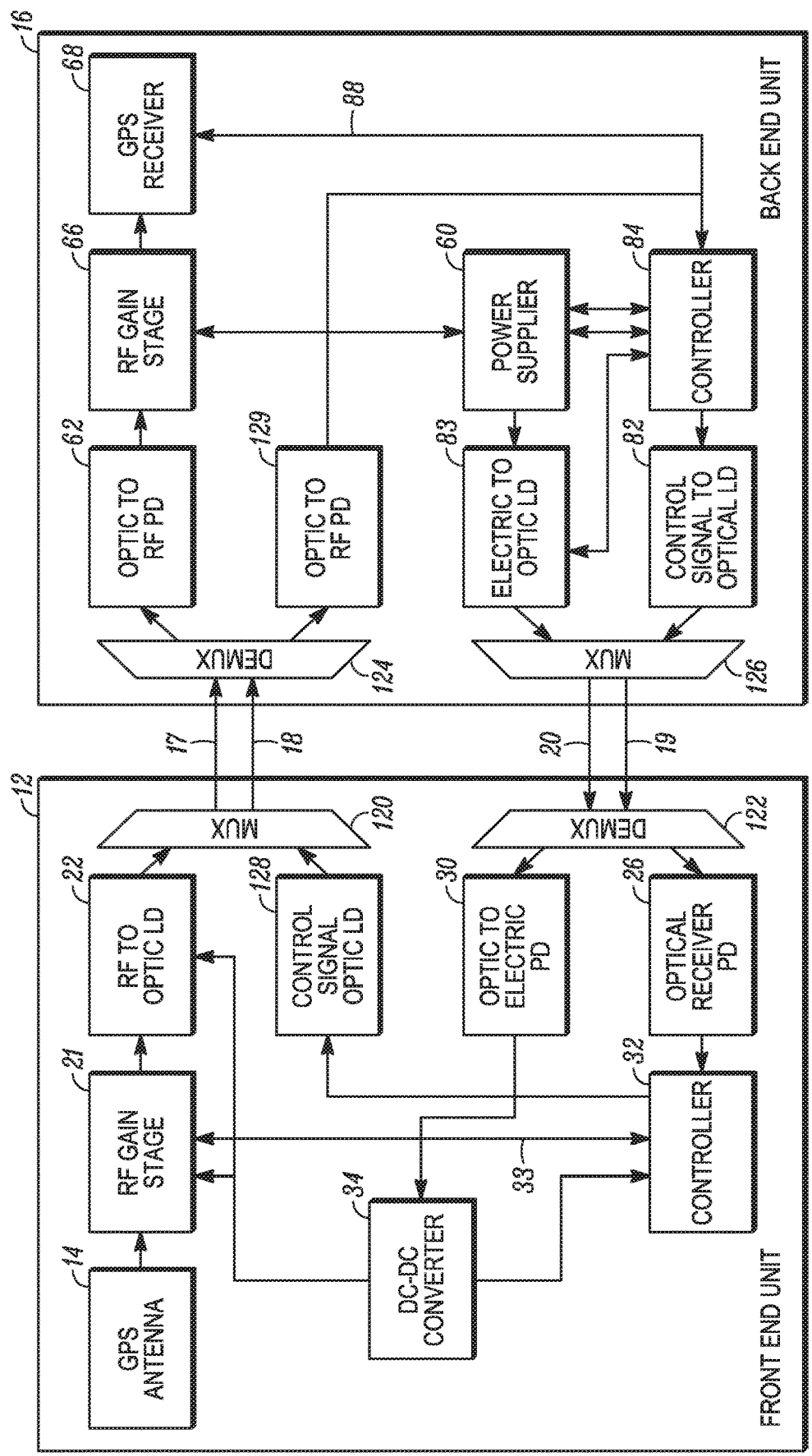

FIG. 5 presents yet another embodiment with multiplexer 120 and a demultiplexer 122 in the FEU 12 and a multiplier 126 and a demultiplexer 124 in the BEU 16. According to this embodiment, the GPS optical signal and the parameter optical signal are multiplexed in the FEU 12 (sending end) and demultiplexed in the BEU 16 (the receiving end). Similarly, the control optical signal and the power optical signal are multiplexed at the BEU 16 and demultiplexed at the FEU 12. Those two signals can be carried over the same fiber optic cable between the FEU and the BEU.

Figure 6:
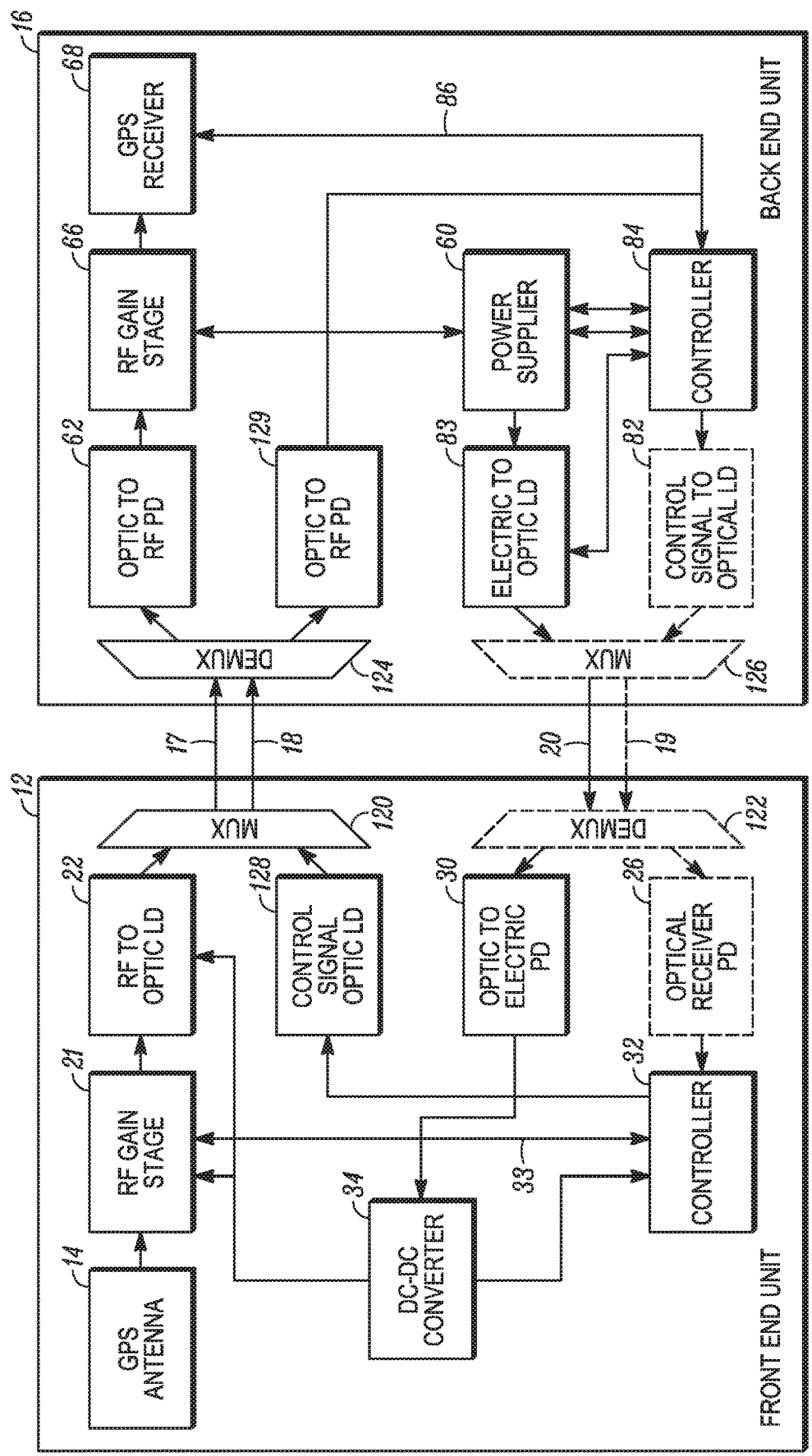

FIG. 6 is yet another embodiment of the invention, where optional functional blocks are shown with dashed lines.

From the described embodiments, it can be seen that there are multiple techniques and media paths for transferring signals between the FEU and the BEU. The signals (GPS, control, parameters, and power) can be combined in the optical domain and various wavelength division multiplexing/demultiplexing schemes can be employed or different frequencies can be utilized for the different signals. Alternatively, the GPS and control signals can occupy different RF frequencies, combined in the radio frequency domain, and then converted to a single optical wavelength. The power supplied by the BEU to the FEU can be supplied as a direct current voltage.

Figure 7:
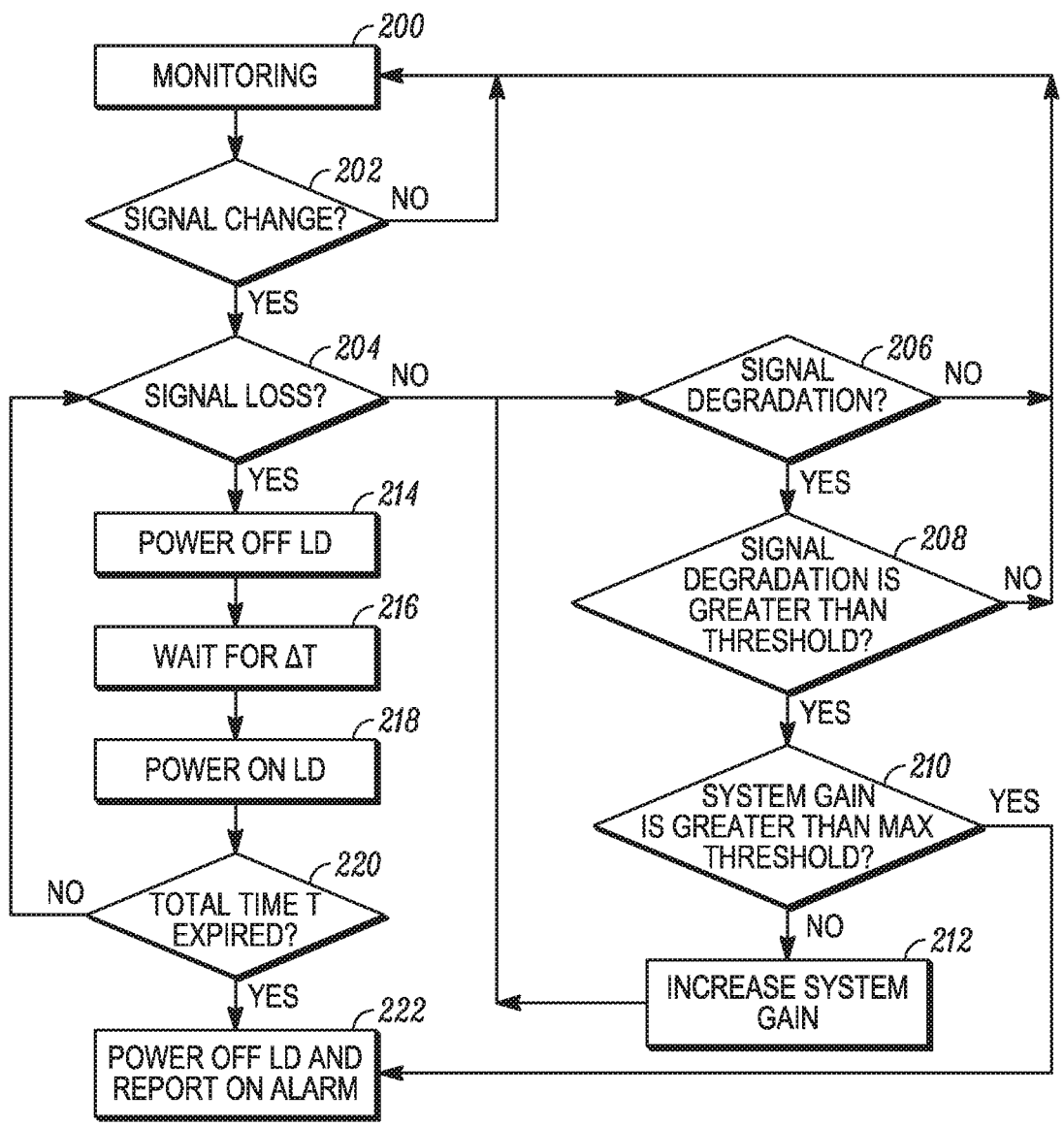
FIG. 7 is a flowchart depicting operation of the system of the invention.

An operation and monitoring algorithm is illustrated in FIG. 7 and described below.

Monitoring step 200: the monitoring step collects the performance measurement information regarding the GPS RF signal (from the FEU and/or the BEU), such as signal quality (C/No, carrier-to-noise density, alternatively, a signal-to-noise ratio can also be used), the uniquely assigned number of the locked satellite, the number of the viewing satellite, signal levels of each satellite, etc. This step collects information from the RF gain stages in the FEU and the BEU and the GPS signal level and quality from the GPS receiver.

Signal change decision step 202: the controller 84 in the BEU 16 checks for changes in performance measurements, as either decoded from the GPS signal or from the RF signal level, for comparison with previously stored data. A negative result from the decision step 202 returns processing to the monitoring step 200.

Signal loss decision step 204: following the affirmative branch from the decision step 202 (indicating a change in signal level), the BEU controller 84 determines whether the GPS RF signal has been lost.

Signal degradation decision step 206: following the negative branch from the decision step 204 (no signal loss), step 206 determines whether there has been any signal degradation.

Signal degradation relative to threshold decision step 208: following the affirmative branch from the decision step 206 (there has been some signal degradation), this step determines if the signal quality or level exceeds a predefined threshold value. There are two signal aspects analyzed at this decision step: the signal power level and the signal quality (e.g. SNR).

A negative result from either decision step 206 or 208 (no signal degradation and or signal degradation below a threshold) returns processing to the monitoring step 200.

System gain relative to a threshold decision step 210: following the affirmative path from the decision step 208 (there has been some signal degradation), this step determines whether the current system gain exceeds a predefined upper gain limit (maximum gain).

Increase system gain step 212: if the decision step 210 results in a negative answer (gain limit has not reached), processing continues to this step 212 where the gain is increased by a predefined amount.

Power off and report alarm step 222: if the result from the decision step 210 is affirmative (maximum gain reached), processing moves to step 222 where the power laser diode 83 in FIG. 2 is turned off, essentially stopping the flow of power to the FEU 12, and an alarm is reported.

Returning back to the decision step 204 (signal loss?), an affirmative branch from this step (indicating that the GPS signal has been lost) continues processing to a step 214 where the power supply 80 and/or the laser diode 83 in the back-end unit 16 are turned off.

At a step 216 processing halts for a time Δt; at this step a counter starts and runs for a predefined time. In one embodiment Δt is two seconds.

At a step 218, electric power is resupplied to the laser diode 83 in the back-end unit 16, which effectively powers-up the FEU 12. In one embodiment, this step also increases gain supplied by the RF gain stage 21 in the FEU.

A decision step 220 determines whether a predefined time T has expired. since the loss of GPS signal was first observed. In one embodiment the predefined time is ten seconds.

An affirmative answer from the decision step 220 moves processing to the step 222, and as described above, the power laser diode 83 is turned off and an alarm issued.

A negative answer from the decision step 220 (time T has not elapsed) returns processing to the decision step 204 for another iteration through steps 204, 214, 216, 218, and 220. When the total time T has elapsed, processing continues to the step 222 for turning off the power and issuing an alarm.

In lieu of using a predetermined time interval T associated with the decision step 220, the algorithm employs a numerical value of iterations through the steps 204, 214, 216, and 218. For example, in one embodiment ten iterations are counted at the decision step 220.

Compared to prior art systems, the present invention offers several advantages and is patentably distinct therefrom. The GPS/RF system of the invention transmits a GPS RF signal over fiber and is powered by power supplied from a remote power supply (in the BEU) also over the fiber optical cable. A controller manages the BEU power supply based on inputs from the various modules of the system.

Amplifier gain stages compensate for signal losses during conversion between the optical domain and the electric domain.

The system senses the received RF signal quality and power level to control system gain and thereby maintain a predefined GPS RF signal level. A fixed gain is a default value.

A control algorithm monitors the GPS/RF signal quality and maintains the proper level of GPS RF signal power and quality. The algorithm also detects system malfunction and power loss, reporting an alarm if either event occurs.

The inventive GPS/RF system provides diversity operation, by, for example, switching to a different FEU if the control algorithm detects a FEU failure. If the received RF signal suffers from poor signal quality and/or a low power level, the system switches to a different RF receiver. Thus, a system comprising multiple FEUs is advantageous.

As is known in the art, a broken optical fiber may cause either a health hazard or a fire hazard due to leaking of the laser beam. To avoid such a situation, in one embodiment a heartbeat message is sent from either the BEU to the FEU or vice versa. The heartbeat signal can be sent when the system is powered-up or periodically during operation. If the heartbeat signal is not detected at the receiving end, the system is powered down. In one embodiment, the heartbeat signal is sent over a separate fiber optic cable, or the heartbeat signal can be multiplexed with the GPS signal, the control signal, or the parameter signal.

What is claimed is:

1. A system within a structure for providing a location of the structure, the system comprising:
   an antenna mounted on the structure for receiving a front-end unit (FEU) GPS electrical signal from an orbiting satellite;
   a FEU gain stage for receiving and amplifying the FEU GPS electrical signal if the FEU GPS signal falls below a predetermined signal quality or signal strength;
   the FEU for converting the FEU GPS electrical signal to a FEU GPS optical signal, and transmitting the FEU GPS optical signal over an optical fiber to a back-end unit;
   the back-end unit (BEU) for receiving the FEU GPS optical signal, converting the FEU GPS optical signal to a BEU GPS electrical signal
   a BEU gain stage for receiving and amplifying the BEU GPS signal if the BEU GPS signal falls below a predetermined signal quality or signal strength and inputting the BEU GPS electrical signal to a GPS receiver;
   the GPS receiver for determining the location of the structure responsive to the GPS electrical signal;
   a power supply in the BEU for supplying power to the FEU over an optical fiber connecting the BEU and FEU;
   a controller in the FEU or the BEU for monitoring the GPS electrical signal or the GPS optical signal and for commanding the power supply to cease supplying power to the FEU for a predetermined first time interval, responsive to determining loss of the GPS electrical signal or the GPS optical signal;
   the controller for commanding the power supply to resupply power to the FEU at the end of the first time interval and for redetermining presence of the GPS electrical signal or the GPS optical signal after resupply of power;
   if the controller redetermines the GPS electrical signal or the GPS optical signal is present, commanding the power supply to continue supplying power to the FEU;
   if the controller determines the GPS electrical signal or the GPS optical signal is not present, during a second predetermined time interval or after a predetermined number of iterations, the controller iterating steps of:
      commanding the power supply to cease supplying power to the FEU for the first time interval;
      commanding the power supply to resupply power to the FEU at the end of the first time interval;
      redetermining presence of the GPS electrical signal or the GPS optical signal after resupply of power;
      if at any time during the second time interval or the predetermined number of iterations, the GPS electrical signal or the GPS optical signal is present, the controller for commanding the power supply to continue supplying power to the FEU; and
      at an end of the second time interval and if neither the GPS optical signal nor the GPS electrical signal is present, the controller for commanding the power supply to cease supplying power to the FEU and to issue an alarm.

2. The system of claim 1, further comprising:
   one or more optical fibers connecting the FEU and the BEU;
   the FEU further comprising:
      a first laser diode for receiving and converting the FEU GPS electrical signal to a FEU GPS optical signal and inputting the FEU GPS optical signal to one of the one or more optical fibers;
      a FEU controller for receiving operating parameters from modules of the FEU and for producing a FEU parameters electrical signal; and
      a second laser diode for receiving and converting the FEU parameters electrical signal to a FEU parameters optical signal, and for supplying the FEU parameters optical signal to one of the one or more optical fibers.

3. The system of claim 1, further comprising:
   an optical fiber connecting the FEU and the BEU;
   the FEU further comprising:
      a first laser diode for receiving and converting the FEU GPS electrical signal to a FEU GPS optical signal;
      a FEU controller for receiving operational parameters from modules of the FEU and producing a FEU parameters electrical signal;
      a second laser diode for receiving and converting the FEU parameters electrical signal to a FEU parameters optical signal; and
      a multiplexer for receiving, multiplexing and sending the FEU GPS optical signal and the FEU parameters optical signal over the optical fiber to the BEU; and
      the BEU further comprising a demultiplexer for demultiplexing the FEU GPS optical signal and the FEU parameters optical signal.

4. The system of claim 2, the BEU further comprising:
   a first photodiode for receiving and converting the FEU GPS optical signal to a BEU GPS electrical signal;
   a GPS receiver for receiving and determining the location of the structure from the BEU GPS electrical signal as received from the BEU RF gain stage;
   a second photodiode for receiving and converting the FEU parameters optical signal to a BEU parameters electrical signal;

a BEU controller for receiving the BEU parameters electrical signal and for producing a BEU control electrical signal responsive thereto;
   a third laser diode for converting the BEU control electrical signal to a BEU control optical signal and for inputting the BEU control optical signal to one of the one or more optical fibers for receiving by the FEU for use in controlling one or more modules of the FEU;
   a power supply for producing a BEU power electrical signal; and
   a fourth laser diode for receiving and converting the BEU power electrical signal to a BEU power optical signal and for supplying the BEU power optical signal to one of the one or more optical fibers.

5. The system of claim 3 further comprising:
   an optical fiber connecting the FEU and the BEU;
   the BEU further comprising:
      a first photodiode for receiving and converting the FEU GPS optical signal to a BEU GPS electrical signal;
      a GPS receiver for receiving and determining the location of the structure from the BEU GPS electrical signal as received from the BEU RF gain stage;
      a second photodiode for receiving and converting the FEU parameters optical signal to a BEU parameters electrical signal;
      a BEU controller for receiving the BEU parameters electrical signal and for producing a BEU control electrical signal responsive thereto for use in controlling one or more modules of the FEU;
      a third laser diode for converting the BEU control electrical signal to a BEU control optical signal;
      a power supply for producing a BEU power electrical signal; and
      a fourth laser diode for receiving and converting the BEU power electrical signal to a BEU power optical signal;
      a multiplexer for receiving, multiplexing and sending the BEU control optical signal and the BEU power optical signal over the optical fiber to the FEU; and
      the FEU further comprising a demultiplexer for demultiplexing the BEU control optical signal and the BEU power optical signal.

6. The system of claim 1, the FEU further comprising, a photodiode for receiving and converting a BEU power optical signal, produced by a power supply in the BEU, to a FEU power electrical signal, and a DC to DC converter for receiving as an input the FEU power electrical signal and for producing as an output a DC voltage for powering modules in the FEU.

7. The system of claim 1, further comprising:
   the controller comprising a BEU controller for producing a BEU control electrical signal responsive to operating parameters of FEU modules;
   a laser diode for receiving and converting the BEU control electrical signal to a BEU control optical signal and for supplying the BEU control optical signal to the FEU;
   a photodiode in the FEU for receiving and converting the BEU control optical signal to a FEU control electrical signal and for supplying the FEU control electrical signal to one or more modules of the FEU for controlling the one or more modules of the FEU.

8. The system of claim 1, further comprising:
   the controller comprising a FEU controller for producing a FEU parameters electrical signal responsive to operating parameters of FEU modules;
   a laser diode for receiving and converting the FEU parameters electrical signal to a FEU parameters optical signal and for supplying the FEU parameters optical signal to the BEU;
   a photodiode in the BEU for receiving and converting the FEU parameters optical signal to a BEU parameters electrical signal and for supplying the BEU parameters electrical signal to a BEU controller for issuing commands for controlling modules of the FEU.

9. The system of claim 1, further comprising a heartbeat message sent from the FEU to the BEU or from the BEU to the FEU, wherein the heartbeat message, upon receipt, indicates connectivity between the FEU and the BEU.

10. The system of claim 1, further comprising a plurality of FEU's operative with the BEU, the plurality of FEU's available for operational status if an operating FEU fails.

11. A method for controlling a GPS locating system comprising a front-end unit (FEU) connected to a back-end unit (BEU) by a fiber optic cable, the method comprising:
   monitoring a GPS electrical signal or a GPS optical signal;
   determining whether a loss of the GPS electrical signal or of the GPS optical signal has occurred;
   commanding a power supply to cease supplying power to the FEU for a first predetermined time interval if the GPS electrical signal or the GPS optical signal has been lost;
   commanding the power supply to resupply power to the FEU at an end of the first time interval and redetermining presence of the GPS electrical signal or the GPS optical signal after resupply of power;
   if the GPS electrical signal or the GPS optical signal is present after resupply of power, commanding the power supply to continue supplying power to the FEU;
   if the GPS electrical signal or the GPS optical signal is not present after resupply of power, iterating, during a second predetermined time interval or a predetermined number of iterations, steps of:
      commanding the power supply to cease supplying power to the FEU for a duration of the first time interval;
      commanding the power supply to resupply power to the FEU at the end of the first time interval;
      redetermining presence of the GPS electrical signal or the GPS optical signal after resupply of power;
      if at any time during the second time interval the GPS electrical signal or the GPS optical signal is present, commanding the power supply to continue supplying power to the FEU; and
      at an end of the second time interval or after iterating the predetermined number of iterations, and if neither the GPS optical signal nor the GPS electrical signal is present, commanding the power supply to cease supplying power to the FEU and to issue an alarm.

12. The method of claim 11, wherein one or both steps of commanding the power supply to resupply power to the FEU at the end of the first time interval, further comprises increasing system gain.

13. The method of claim 12, wherein increasing system gain further comprises increasing system gain in the FEU or in the BEU or both the FEU and BEU.

14. The method of claim 11, further comprising:
   if a step of determining determines that neither the GPS electrical signal nor the GPS optical signal has been lost;

determining whether the GPS optical signal or the GPS electrical signal has suffered degradation;

if the GPS optical signal or the GPS electrical signal has not suffered degradation, returning to a monitoring step;

if the GPS optical signal or the GPS electrical signal has suffered degradation, determining whether the signal degradation exceeds a predetermined threshold;

if the signal degradation does not exceed the threshold, returning to the monitoring step;

if the signal degradation exceeds the threshold, determining whether a system gain is greater than a maximum gain;

if the system gain is not greater than the maximum gain, increasing the system gain and returning to a step of determining whether the GPS optical signal or the GPS electrical signal has suffered degradation; and if the system gain is at a maximum gain, commanding the power supply to cease supplying power to the FEU and to issue an alarm.

\* \* \* \* \*